Patented Apr. 29, 1930

1,756,624

UNITED STATES PATENT OFFICE

ABRAHAM SIDNEY BEHRMAN, OF CHICAGO, ILLINOIS, ASSIGNOR, BY MESNE ASSIGNMENTS, TO THE PERMUTIT COMPANY, OF NEW YORK, N. Y., A CORPORATION OF DELAWARE

BASE EXCHANGE SUBSTANCE

No Drawing.    Application filed December 5, 1924. Serial No. 754,202.

This invention relates to base exchange materials, particularly of the artificial or synthetic class.

The general object of the invention is the provision of a base exchange material which may be manufactured economically, which has good durability, and which possesses a proper capacity and activity for exchange of bases to qualify it for the customary industrial uses.

Another object is the provision of an advantageous method for the preparation of such material.

Other and further objects of the invention will be pointed out hereinafter, indicated in the appended claims, or obvious to one skilled in the art upon an understanding of the present disclosure.

A characterizing feature of the present invention is the employment of the oxide or the hydroxide of a metal, particularly of an amphoteric metal, as the foundation or source material from which the zeolite is formed. The nature of the invention will be best understood by consideration of certain illustrative examples.

As stated above, I employ as the basic or foundation element the oxide or hydroxide of a metal preferably an amphoteric metal, it being understood that in the event the start is made with the oxide, that it is hydrated either preliminarily or incident to the carrying out of the process. The hydroxide or oxide may be a natural product such as bauxite or gibbsite among the aluminum hydroxides, or a naturally occuring iron hydroxide such as limonite. I have found of particular advantage, among the natural materials, a rather impure limonite found in the Iron Mountain region in Michigan. Suitable artificial metallic hydroxides may be prepared in various ways. As an example of procedure for preparation of a suitable artificial hydroxide of iron, prepare 25 per cent solutions of ferric chloride (crystals) and of caustic soda, take 5 volumes of the ferric chloride solution and dilute it with water to 20 volumes, and likewise dilute 4 volumes of the caustic soda solution with water to 20 volumes. These dilutions are then combined, giving a mixture that is alkaline to phenolphthalein, the most advantageous procedure being to add the caustic solution to the iron solution, accompanied by stirring. This procedure forms a harder and firmer product than when the order of addition is reversed or when the two solutions are added simultaneously to a third container. The resulting precipitate is filtered, with or without washing, and then dried, preferably at a temperature under 100° C. This leaves a product in the form of hard lumps, and these are fragmented or crushed and screened to a suitable size, as for instance 20–60 mesh. The material thus obtained will generally have a gravimetric density of about 55 to 60 pounds per cubic foot.

For the preparation of a base exchange material from the hydroxide of iron thus prepared, take a convenient or appropriate volume of the particles and treat them with a solution of sodium silicate which is made by diluting ordinary commercial water glass (40° Baumé) to five times its volume with water, using such an amount of sodium silicate as will afford an excess over the amount which will combine with the iron hydroxide. As a suitable proportion I usually employ about five pounds of water glass for each pound of iron hydroxide. If the sodium silicate is not sufficiently alkaline to give an end product of the desired ratio of alkali metal oxide to iron oxide to silica, the deficiency may be supplied by the addition of sodium hydroxide or carbonate to the silicate solution before or during the treatment of the hydroxide particles. Such treatment is accomplished by immersion of the volume of the hydroxide particles in the solution, with occasional agitation to secure the desired uniformity and intimacy of contact. I prefer that the treatment should be made with heat, so that the solution is at or near the boiling temperature. It may be conducted under pressure in the autoclave. Any suitable autoclave may be utilized. Any pressure may be utilized from atmosphere pressure up. However, it is effective at lower temperatures, although more time is required. The treatment preferably is continued to the point where combination of the sodium silicate with all of the iron hydroxide is obtained, it being understood that the actual period of treatment will vary with different factors, such as the amount of material in the batch, the size of the particles, the temperature, etc. After the treatment with the silicate solution the latter may be saved and reinforced by the addition of new material for treatment of a succeeding bath of hydroxide. The solid material resulting from the treatment retains its granular form, and is preferably subjected to a washing with water to remove any uncombined excess of the silicate solution. It is then ready for use, and may be packed or handled either wet or dry.

In the preparation of synthetic hydroxides for use in the manner indicated, I have found it to be of advantage in some cases, to add to the reacting metallic chloride and base solutions, a highly ionized electrolyte, such as the alkali metal salts, sodium chloride or sodium sulphate. These function to some extent as a coagulant with the result, as I have found in the preparation of aluminum hydroxide from aluminum sulphate and caustic soda, that the presence of even so small an amount of sodium chloride as one-half of one per cent by weight of the reacting solution materially affects the character of the dried hydroxide, making it under proper conditions, quite hard, glassy and transparent. The material thus characterized effects the desired combinations under the treatment with the metallic silicate solution as described above, and produces an end product of superior durability.

In using a natural iron hydroxide, I prefer to employ the limonite obtained from the Iron Mountain region of Michigan, as mentioned above. Such material is prepared by simply crushing or fragmenting and screening to obtain particles of the desired size, which are then subjected to the treatment with the metallic silicate in the manner described above with reference to the use of the synthetic hydroxide. In the use of aluminum hydroxide, a synthetic material may be prepared in a manner similar to that above described for preparation of the iron hydroxide, except that in the case of the aluminum hydroxide, I find it advantageous to mix the reacting solutions by adding them simultaneously to a third vessel. Solutions of aluminum sulphate and caustic soda are convenient reagents to employ in the production of the aluminum hydroxide. Natural aluminum hydroxides suitable for employment are the hard rocky varieties of bauxite or gibbsite. These are fragmented or reduced to particles of the proper size and then subjected to the treatment with the alkali metal silicate.

While the above examples are typical and convenient procedures for the practice of the invention, they do not by any means constitute all of the procedures or variations contemplated or included in its scope. As examples of variations, I may obtain a suitable end product by treating the precipitated metallic hydroxide, while in the moist or gelatinous condition, with the alkali metal silicate solution, then follow with the drying silicate solution, then follow with the drying and reduction to the form of particles. Or I may start with the metallic hydroxide and the alkali metal silicate both in dry powdered form, and after intimately mixing them, moisten the mixture with sufficient water to form a paste which will set to a gelatinous mass that will harden on drying or heating. This is then reduced to the desired fragmented form. In the products resulting from any of the courses of procedure indicated, it frequently occurs that the base exchange capacity may be increased by further treatment of the particles with a solution of an alkali metal hydroxide or carbonate.

It is obvious that any practicable concentration of an alkali metal hydroxide or carbonate may be used, and it is also obvious that any practicable temperature may be used. If it is desired to increase the base exchange capacity to a lesser degree or at a slower rate, a lesser concentration and/or a lesser temperature may be utilized. If it is desired to increase the base exchange capacity to a greater degree or at a greater rate, a greater concentration and/or a higher temperature may be utilized.

This further treatment may be similar to the treatments previously described. In the treatments previously described a solution of sodium hydroxide (diluted to twenty times its volume) is employed. Alkali metal hydroxide or carbonate solutions of about the same concentrations or of other concentrations may be employed. In this further treatment the size of particles or fragments of the amphoteric oxide compound or amphoteric hydroxide will be the same as in the preceding treatment, namely from 20-60 mesh.

It is apparent that the oxides, the hydrated oxides or the various hydroxides of the amphoteric metals are equivalents in this process, and the expression "amphoteric metal oxide compound," used in the claims, is intended to include them. The process of this application affords a general method of forming double silicates, but its application is of special advantage in the formation of base exchange materials. In the formation of base exchange materials, it is desirable to use an insoluble hydroxide or hydrated oxide of an amphoteric metal, which hydroxide or hydrated oxide should still be substantially basic.

Although iron for many purposes is not classed as an amphoteric metal, it does behave as an amphoteric metal similar to aluminum in constituting base exchange silicates or zeolites. The term "amphoteric metal," as applied to that group of heavier metals which combine with an alkali or alkali earth metal oxide and silica to form a zeolite or base exchange silicate, is widely used in the art. For example in the Rudorf Patent 1,263,707 both aluminum and iron were described and claimed as amphoteric metals, together with tin, titanium, zirconium, zinc, lead and chromium.

What I claim is:

1. The process of preparing a base exchange material which comprises preparing a hydroxide of one of a group of metals comprising iron and aluminum in fragmented form and then subjecting the same to the reaction of a solution of an alkali metal silicate.

2. The process of forming a base exchange material which comprises the subjection of an oxide compound of one of a group of metals comprising iron and aluminum to reaction with an alkali metal silicate.

3. The process of preparing a base exchange material which comprises the precipitation of a hydroxide of one of a group of metals comprising iron and aluminum in the presence of a coagulant, followed by the subjection of such hydroxide to reaction with a solution of an alkali metal silicate.

4. A base exchange material comprising a granular solid containing the reaction products of a hydroxide of one of a group of metals comprising iron and aluminum and an alkali metal silicate.

5. A base exchange material comprising the reaction product of an alkali metal silicate and fragmented particles of an oxide compound of one of a group of metals comprising iron and aluminum.

6. The process of preparing metallo silicates which comprises treating an insoluble amphoteric metal oxide compound with an alkali metal silicate.

7. The process of preparing metallo silicates which comprises treating an insoluble amphoteric metal oxide compound with a solution of an alkali metal silicate under pressure.

8. The process of increasing the base exchange capacity of artificial base exchange silicates which comprises treating such silicate with a solution of an alkali metal hydroxide or carbonate.

9. The process of increasing the base exchange capacity of metallo silicates made by treating an amphoteric metal oxide compound with an alkali metal silicate which comprises treating such silicate with an alkali.

10. The process of claim 9 in which the alkali is caustic alkali.

11. A metallo silicate comprising the reaction product of an insoluble amphoteric metal oxide compound and an alkali metal silicate.

12. An artificial base exchange silicate the base exchange capacity of which has been increased by treatment with an alkali.

13. The process of preparing a base exchange material which comprises precipitating an insoluble metallic hydroxide, fragmenting the precipitate, and subjecting the fragments to treatment with an alkali metal silicate solution.

14. The process of preparing metallo silicates which comprises treating an insoluble amphoteric metal oxide compound with a solution of an alkali metal silicate under pressure in an auto-clave.

15. The process of preparing metallo silicates which comprises treating an insoluble amphoteric metal oxide compound with a solution of an alkali metal silicate under pressure in an auto-clave at boiling temperature.

16. A process of preparing a base exchange silicate which comprises treating an insoluble amphoteric metal oxide compound with an alkali metal silicate and then treating the resulting product with caustic alkali.

17. An artificial base exchange silicate which has been prepared by treating an insoluble amphoteric metal oxide compound successively with an alkali metal silicate and with alkali.

18. A process of preparing a base exchange material which comprises providing an insoluble amphoteric metal oxide compound, fragmenting the compound and subjecting the fragments to treatment with an alkali metal silicate solution containing additional alkali.

19. A process of preparing a base exchange material which comprises providing an insoluble amphoteric metal oxide compound, fragmenting the compound, subjecting the fragments to prolonged treatment with a hot alkali metal silicate solution until the chemical combination is complete, and then removing the excess alkali metal silicate solution by washing.

20. A base exchange material comprising a granular solid containing the reaction products of a hydroxide of one of a group of metals comprising iron and aluminum and an alkali metal silicate.

In testimony whereof I have hereunto signed my name.

ABRAHAM SIDNEY BEHRMAN.